June 11, 1940.   E. PICHA   2,204,256

MOWING MACHINE FOR BENT TURFS

Filed Oct. 15, 1938

INVENTOR
EMIL PICHA
By Paul, Paul, Moore & Giese
ATTORNEYS

Patented June 11, 1940

2,204,256

UNITED STATES PATENT OFFICE 2,204,256

MOWING MACHINE FOR BENT TURFS

Emil Picha, Minneapolis, Minn., assignor to Toro Manufacturing Corporation of Minnesota, Minneapolis, Minn., a corporation of Minnesota Application October 15, 1938, Serial No. 235,229

4 Claims. (Cl. 56—252)

The present invention relates to lawn mowing machines, and particularly to machines that are used for the precision cutting of grassy areas such as the putting greens of golf courses, lawns, and park areas, and for the cutting of bent type grasses.

In lawn mowing machines of the type having a stationary cutting bar and a cooperating cutting reel each blade of grass is sheared off as engaged by the revolving and stationary blades, while blades that are inclined in position are less apt to become properly engaged, and as a result the length of the grass blades varies widely, in accordance with their inclination. This characteristic of the mower tends to combine with the habit of bent grasses to incline generally in a given area in one direction, as downgrade or toward the sun, and produces what is known as "grain" in a putting green. Such surfaces are undesirable because roughness is easily developed by inclined grass blades becoming raised to the upright position, as by scuffing from a shoe or swinging of a golf club, and because a golf ball does not roll with the same true and even course over a grained turf as over a turf in which the blades generally stand upright.

It has heretofore been common practice, after objectional grain has developed in a turf, to apply intensified corrective measures, such as a fine-toothed hand rake used against the grain just prior to mowing, or a brush fixed in front of the mower so as to raise the grass blades when traveling against the grain, and cause them to be cut. Such measures involve much extra labor and have but temporary effect. Moreover, due to the large amount of vegetable growth that is raised up and cut at one time, the general effect is injurious to the turf because the root system of the grass is so quickly exposed to the burning rays of the summer sun.

By an improved mower of the type hereinafter disclosed it has been discovered that this undesirable condition can be prevented, and that being prevented, no injurious corrective measures for the condition are necessary. This is accomplished by the regular routine of mowing with a great saving of labor, and the desired best condition remains permanent as long as the improved mower is used.

It is a specific object of the invention to provide an improved mower, including means for positioning the grass blades for cutting.

It is a further object of the invention to provide an improved mower including a comb located between the conventional front roller of the mower, and the cutting reel, for elevating the grass blades and positioning them for efficient and orderly cutting at relatively uniform lengths.

Other objects of the invention are the adjustment and precise positioning of such a comb and those implied by the specification, claims and drawing and those inherent in the apparatus described, claimed and illustrated.

Figure 1:
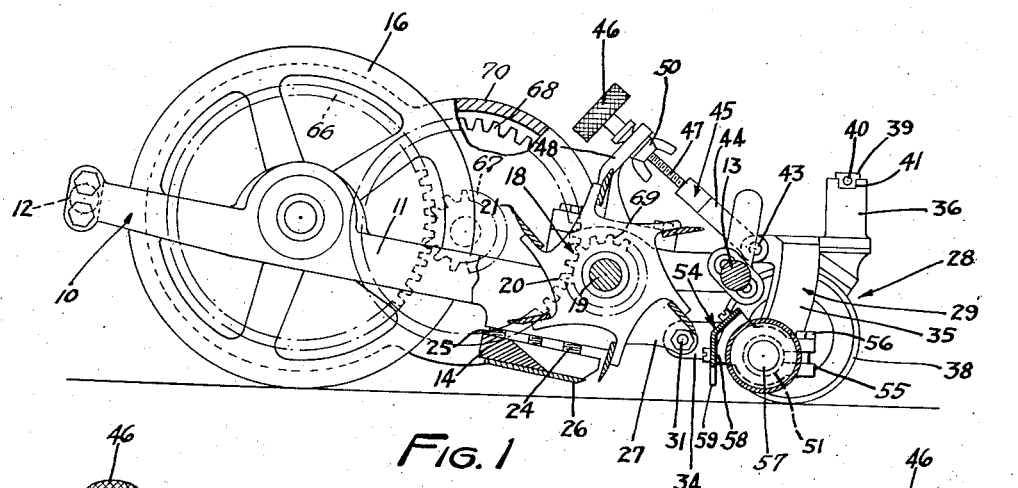
Figure 1 is a side elevation partly in section, showing an improved lawn mower of the present invention.
Figure 2:
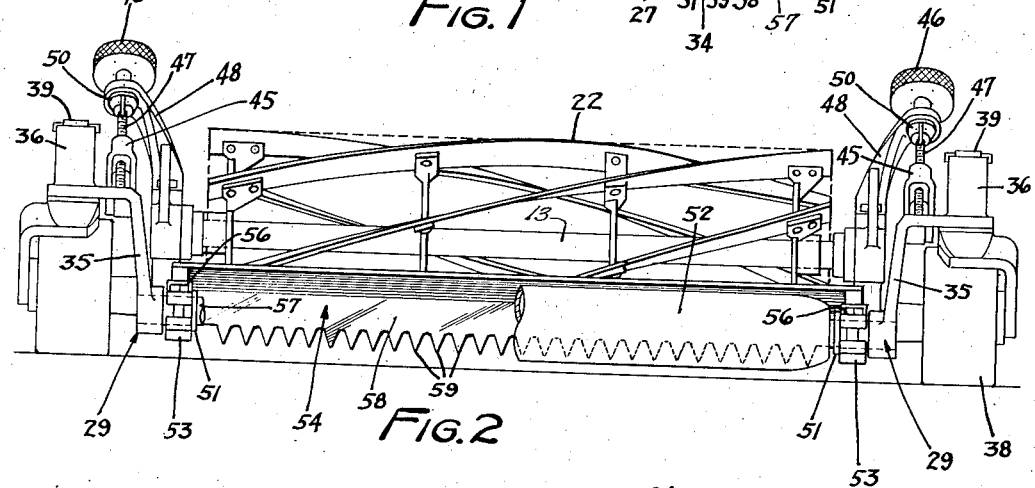
Figure 2 is an elevational view of the front part of the device shown in Figure 1. Certain of the parts are broken away and others of the parts in the rear of the mower are for clarity omitted.

In Figures 1 and 2 there is illustrated one type of lawn mowing unit embodying the improvements of the present invention. This lawn mowing unit comprises a frame generally designated 10 having a pair of spaced side rails 11 which are interconnected by a pair of cross bars 12 and 13 and on which is mounted a cutting bar 14. Between the cross bar 12 and knife bar support 14 there is mounted roller 16 which may serve not only to carry the frame but also as a traction roller for driving the unit, as in a power operated mower. For a hand-propelled mower, roller 16 may be connected by means to operate a cutting reel presently to be described.

Positioned above the knife bar support 14 there is mounted a cutting reel generally designated 18 which comprises a reel shaft 19. The shaft carries a plurality of spiders 20, which in turn carry the spirally mounted cutting blades 21. The reel is shown in Figure 2 the outside limits of its path of movement being illustrated by the dotted line 22. Such a reel may be operated either by the same source of power (not shown) that operates roller 16, or from the roller itself. Where the reel is driven from the roller 16 the driving connection preferably comprises a gear 66 carried by roller 16. Gear 66 meshes with a small intermediate gear 67, the latter being integral with gear 68. Gear 68 in turn meshes with the gear 69 on the reel shaft 19 and serves to rotate the cutting reel. All of the gears are preferably enclosed in housing 70. A gear drive of this type is shown in Patent 425,687 to Meyer.

Any suitable adjustment such as a plurality of screws 24 and 25 may be provided for positioning the knife bar 26 in proper cooperating relationship to the edges of cutting blades 21.

The forward end 27 of frame 10 carries an adjustable wheel, roller and turf comb unit generally designated 28. The unit comprises a pair of adjustable side brackets generally designated 29 which are pivoted to the forward end 27 of the frame by means of bolts 31 (see Figure 1). Each of the brackets 29 has a horizontal portion 34 and an integrally formed vertical riser 35 which extends outwardly at the upper end to form castor wheel journal 36. The journal 36 is formed to receive the pivot shaft 39 of castor wheel 38, which is accordingly free to pivot in journal 36. The upper portion of the castor wheel journal 36 is formed with a cross slot 41 which receives the retaining pin 40 of the castor wheel pivot shaft 39. The pin 40 not only retains the shaft 39 in place, but also limits the castor movement.

Each of the brackets 29 is also provided with a clevis pivot 43 at the upper part of riser portion 35 which receives the bifurcated end 44 of the adjustable stay, generally designated 45. The adjustment of stay 45 is accomplished by a screw 47 which is threaded into clevis 44, and which is provided at its upper end with a knurled hand wheel 46 and a winged lock nut 50. An upstanding and outwardly extending bracket 48 is provided on each side rail and receives the adjustment screw 47. Hence when the screws 47 are turned, the distance between the bracket 48 and clevis pivot 43 is changed with the result that the whole unit 28 is pivoted about screws 31. This serves to raise or lower the castor wheels 38 which normally determine the elevation of the forward portion of the mowing machine, and the position of the cutting bar 26 is correspondingly varied to control the knife height of the mower.

At the junction of the horizontal section 34 and the vertical riser 35 of each of the brackets 29 there is formed a bearing section 51 which extends inwardly toward the body of the machine. The bearing sections 51 are bored to receive the axle 57 of roll 52 and are finished on the outside to receive the bracket 53 which supports the turf comb 54. Each of the turf comb brackets 53 is split as at 55 and is provided with studs 56 for drawing the split portion closed so as to grip the outer section of bearing section 51.

The rearwardly extending portions of brackets 53 are formed to receive turf comb 54. The comb is formed of sheet steel and is channelled slightly to increase the rigidity of the unit. The comb includes a downwardly extending section 58 which is serrated to form a plurality of teeth 59. The comb 54 and brackets 53 which support it may be adjusted around bearing section 51 as a center, and the teeth 59 may thereby be raised or lowered relative to the surface of the grass being cut. The preferred shape and tooth-length of the comb is such that the comb teeth stand vertical when the tips of the teeth are set very slightly (for example, one-sixteenth inch) below the cutting edge of stationary knife bar 26. This height will usually be above the bottom surface of roll 52. Other vertically adjustable means for comb 54 would be equally effective. As explained above, the forward brackets 29 may likewise be shifted relative to frame 10 so as to raise and lower the cutting bar with reference to the surface of the turf.

It will be noted that roll 52 of the bearing shown at 51 is normally held in a position somewhat elevated above the surface engaged by castor wheels 38. This is the preferred adjustment although in some instances it is desirable to remove the castor wheels and carry the front of the mower on roller 52 only. In the device as shown, the roll 52 will prevent scalping of a hump or ridge which might be cleared by wheels 38.

In the use of the device shown in Figures 1 and 2 the machine is propelled forwardly and as it moves the teeth 59 of turf comb 54 engage and lift the blades of grass which are inclined from the vertical end accordingly positioning them so that they will be clipped off at a uniform length. This is accomplished by mowing the surface, such as a bent turf green in various directions on successive days, as obviously the comb lifts the grass blades effectively only when traveling against or across any grain of the turf. The carrying of the comb at a prescribed height above the root system of the turf by wheels 38 and roller 52 controls the amount of grass that will be lifted from day to day, and prevents injurious exposure of the root system.

Figures 3, 4:
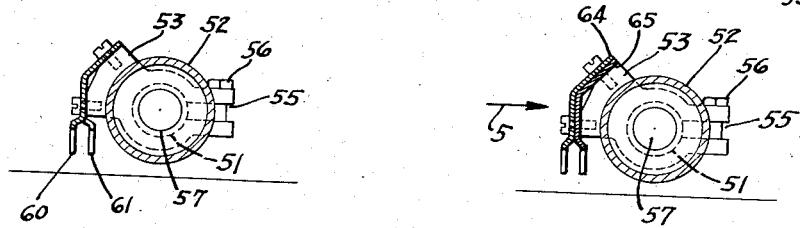
Figures 3 and 4 are cross-sectional views of modifications of the improved comb bar of the present invention.
Figure 5:
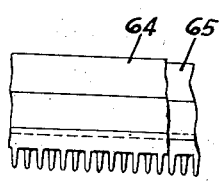
Figure 5 is a fragmentary view in the direction of arrow 5 of the improved comb bars shown in Figure 4.

In the modification of the invention shown in Figure 3 each alternate tooth of the comb 54 is displaced so as to form a double comb having rows 60 and 61. This configuration of the comb 54 is advantageous because the staggered relation of teeth makes feasible a closer spacing. In the modification shown in Figures 4 and 5 the double comb arrangement is also shown but in this instance the comb is made up of separate comb sections 64 and 65, the teeth of which are displaced so as to form two uniform rows of teeth in staggered relation, as shown in Figure 5. The slender shape of comb teeth shown in Figure 5 is also applicable to combs of the constructions shown in Figure 3 or Figure 2, with appropriate lateral spacing.

Many modifications of the invention shown and described herein may obviously be made without departing from the spirit of the invention herein claimed as follows.

I claim:

1. A lawn mowing machine comprising a frame, a knife bar and a cooperating cutting reel mounted on said frame, a turf comb comprising a plurality of spaced rows of teeth, the teeth of adjacent rows being staggered with respect to each other, and means for mounting said comb on said frame with the teeth extending downwardly into contact with the turf.

2. A lawn mowing machine comprising a frame, a knife bar and a cooperating cutting reel mounted on said frame, and a plurality of turf combs mounted substantially parallel with and ahead of said knife bar, the teeth of adjacent combs being staggered with respect to each other, and positioned to engage the turf.

3. A lawn mowing machine for bent grass and the like, including a frame, a knife bar and cooperating cutting reel mounted on said frame, a roller pivotally mounted on said frame ahead of said cooperating knife bar and cutting reel, caster wheels adjacent the ends of said roller and means for raising the blades of the bent grass into cutting position whereby the development of grain in the turf is inhibited, comprising a toothed comb, and bracket means for mounting said comb with the teeth thereof contacting the grass, said bracket means being mounted on said frame concentric with said pivotally mounted roller for movement about the axis of said roller.

4. A machine for the precise mowing of grass on putting greens and the like comprising a pair of side frame members, a cutting reel and cooperating knife bar mounted between said side frame members, ground engaging roller means mounted substantially parallel to the cutting reel between said side frame members behind said cutting reel and knife bar, means for rotating the cutting reel, another ground engaging roller means mounted substantially parallel to and ahead of the cutting reel and knife bar for lifting them over humps and ridges, a toothed grass lifting comb mounted transversely of the frame between the cooperating cutting reel and knife bar and the last mentioned ground engaging roller means, said comb being mounted with the teeth extending downwardly into contact with the grass to be cut for lifting the grass blades for cutting after traversal by said last mentioned roller means, and ground engaging wheels mounted on the frame adjacent the ends of said last mentioned roller means, said wheels being mounted so as to engage the turf and carry the last mentioned roller means out of contact with the turf except when a hump intervenes between the wheels.

EMIL PICHA.